(12) United States Patent
Kim et al.

(10) Patent No.: US 10,584,032 B2
(45) Date of Patent: Mar. 10, 2020

(54) METHOD FOR PREPARING BORON NITRIDE NANOTUBES

(71) Applicant: KOREA INSTITUTE OF SCIENCE AND TECHNOLOGY, Seoul (KR)

(72) Inventors: Myung Jong Kim, Jeollabuk-do (KR); Hyun Jin Cho, Jeollabuk-do (KR); Seokhoon Ahn, Jeollabuk-do (KR); Se Gyu Jang, Jeollabuk-do (KR); Soo Min Kim, Jeollabuk-do (KR); Dong Ick Son, Jeollabuk-do (KR); Jun Hee Kim, Jeollabuk-do (KR); Tae Hoon Seo, Jeollabuk-do (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 15/655,869

(22) Filed: Jul. 20, 2017

(65) Prior Publication Data

US 2018/0037457 A1   Feb. 8, 2018

(30) Foreign Application Priority Data

Aug. 3, 2016   (KR) .......................... 10-2016-0099101

(51) Int. Cl.
*C01B 21/064* (2006.01)
*B01J 19/12* (2006.01)
(Continued)

(52) U.S. Cl.
CPC .......... *C01B 21/064* (2013.01); *B01J 19/121* (2013.01); *B01J 23/745* (2013.01); *B01J 37/347* (2013.01); *B01J 2219/12* (2013.01)

(58) Field of Classification Search
CPC ..... C01B 21/064; B01J 19/121; B01J 23/745; B01J 37/347; B01J 2219/12
(Continued)

(56) References Cited

U.S. PATENT DOCUMENTS

| 3,708,325 A | * | 1/1973 | Kurtz et al. | ............ C22C 49/00 204/192.11 |
| 4,895,628 A | * | 1/1990 | Knudsen | ................ B01J 19/121 204/157.41 |

(Continued)

FOREIGN PATENT DOCUMENTS

| JP | 5059589 B2 | 10/2012 |
| KR | 10-2010-0033964 A | 3/2010 |

(Continued)

OTHER PUBLICATIONS

Zhou et al, "Catalyst effects on formation of boron nitride nanotubules synthesized by laser ablation," Solid State Communications 109 (1999) 555-559 (Year: 1999).*

(Continued)

*Primary Examiner* — Nicholas A Smith
*Assistant Examiner* — Colleen M Raphael
(74) *Attorney, Agent, or Firm* — Cantor Colburn LLP

(57) ABSTRACT

Provided is a method for preparing boron nitride nanotubes, the method including: injecting a boron-metal catalyst composite into a reaction chamber; injecting a nitrogen precursor into the reaction chamber; producing a decomposition product of the boron-metal catalyst composite in a gas state by irradiating the boron-metal catalyst composite with a carbon dioxide laser or a free electron laser; and forming boron nitride nanotubes by reacting the decomposition product of the boron-metal catalyst composite in the gas state with the nitrogen precursor.

20 Claims, 15 Drawing Sheets

(51) Int. Cl.
*B01J 23/745* (2006.01)
*B01J 37/34* (2006.01)

(58) Field of Classification Search
USPC .................... 204/157.41, 157.45, 157.46
See application file for complete search history.

(56) References Cited

U.S. PATENT DOCUMENTS

| | | | |
|---|---|---|---|
| 9,862,604 B2* | 1/2018 | Kim | C01B 21/064 |
| 2009/0252886 A1* | 10/2009 | Barker | C01B 21/064 |
| | | | 977/843 |
| 2010/0192535 A1 | 8/2010 | Smith et al. | |
| 2013/0144576 A1 | 6/2013 | Gnoffo et al. | |
| 2015/0086460 A1* | 3/2015 | Kim | C23C 18/1204 |
| | | | 423/290 |
| 2015/0329360 A1* | 11/2015 | Li | C01B 21/064 |
| | | | 427/255.38 |
| 2017/0197832 A1* | 7/2017 | Fathalizadeh | C01B 21/064 |

FOREIGN PATENT DOCUMENTS

| KR | 10-1165329 B1 | 7/2012 |
|---|---|---|
| KR | 10-2012-0135186 A | 12/2012 |

OTHER PUBLICATIONS

Yu et al, "Synthesis of boron nitride nanotubes by means of excimer laser ablation at high temperature," Appl. Phys. Lett., vol. 72, No. 16, Apr. 20, 1998, pp. 1966-1968 (Year: 1998).*
Cunnings et al, "Mass-production of boron nitride double-wall nanotubes and nanococoons," Chemical Physics Letters 316 2000 211-216 (Year: 2000).*
Machine translation of JP 2009-155176A.*
Arenal et al., "Root-Growth Mechanism for Single-Walled Boron Nitride Nanotubes in Laser Vaporization Technique", J. Am. Chem. Soc., 2007, p. 16183-16189, vol. 129, No. 51, American Chemical Society.
Gnoffo et al., "Modeling of Laser Vaporization and Plume Chemistry in a Boron Nitride Nanotube Production Rig", 43rd AIAA Thermophysics Conference New Orleans, Louisiana, 2012, p. 1-23, American Institute of Aeronautics and Astronautics.
Smith et al. "Very long single- and few-walled boron nitride nanotubes via the pressurized vapor/condenser method", Nanotechnology 20, 2009, p. 1-6, IOP Publishing Ltd, GB.

* cited by examiner

METHOD FOR PREPARING BORON NITRIDE NANOTUBES

CROSS-REFERENCE TO RELATED APPLICATION

This application claims the priority of Korean Patent Application No. 10-2016-0099101, filed on Aug. 3, 2016, and all the benefits accruing therefrom under 35 U.S.C. § 119, the contents of which in its entirety are herein incorporated by reference.

BACKGROUND

1. Field

The present disclosure relates to a method for preparing boron nitride nanotubes (BNNTs). More particularly, the present disclosure relates to a method for preparing boron nitride nanotubes, which has a high production ratio of boron nitride nanotubes with single and double walls.

2. Description of the Related Art

Boron nitride nanotubes are a material having boron and nitrogen bonded to each other at a ratio of 1:1 and have a structure similar to that of carbon nanotubes, but do not mean a structure composed of only carbon, but mean a nanotube structural body having a form in which a boron atom and a nitrogen atom are alternately composed. Similarly to carbon nanotubes, each element in the boron nitride nanotubes is composed of strong sp2 covalent bonds, and weak van der Waals force is present between each layer.

A one-dimensional boron nitride nanotube and a zero-dimensional, two-dimensional, or three-dimensional boron nitride nano structural body are one of the promising materials for composite material applications in which numerous studies have been recently conducted, and the like, and have various excellent physical and chemical properties as in carbon nanotubes, fullerenes, and graphenes, which are a similar structural body. In particular, boron nitride nanotubes have an excellent strength as compared to a standard weight, and have excellent temperature resistance and thermal conductivity sufficient not to be oxidized even in the air at 800° C. unlike carbon nanotubes and a nano structural body, which are oxidized at 500° C. In addition, the boron nitride nanotubes are a promising material capable of shielding radioactivity due to a high piezoelectric effect and a high content of a boron-10 isotope. However, since the first discovery of a boron nitride material, it has been difficult to sufficiently supply high-quality boron nitride nanotubes with single and double walls and a high-quality boron nitride nano structural body, so that studies and commercialization have not been sufficiently conducted in the field of composite materials, and the like.

Meanwhile, the boron nitride nanotubes have been synthesized by an arc-discharge method, a laser method, a ball-milled method, a chemical vapor deposition (CVD) method, and the like for recent several years, but there is a problem in that only a small production at a laboratory level can be achieved, and boron nitride nanotubes to be produced have very large diameters and exhibit a multi-layered boron nitride nanotube structure, so that there is a problem in that the overall physical properties of boron nitride nanotubes exhibit significantly lower values than theoretical physical properties thereof.

Accordingly, there is an urgent need for developing the preparation of boron nitride nanotubes having better physical properties.

REFERENCES OF THE RELATED ART

Non-Patent Documents (Non-Patent Document 1) Arenal et al. J. Am. Chem. Soc. (2007) 129 16183-16189, Root-Growth Mechanism for Single-Walled Boron Nitride Nanotubes in Laser Vaporization Technique (Non-Patent Document 2) Gnoffo et al. 43rd AIAA Thermophysics Conference New Orleans, La.

(Non-Patent Document 3) Smith et al. Nanotechnology 20 (2009) 505604 (6 pp), Very long single- and few-walled boron nitride nanotubes via the pressurized vapor/condenser method

SUMMARY

In an aspect, the present disclosure is directed to providing a method for preparing boron nitride nanotubes, which has a high production ratio of boron nitride nanotubes with single and double walls.

In an aspect, the present disclosure provides a method for preparing boron nitride nanotubes, the method including: injecting a boron-metal catalyst composite into a reaction chamber; injecting a nitrogen precursor into the reaction chamber; producing a decomposition product of the boron-metal catalyst composite in a gas state by irradiating the boron-metal catalyst composite with a carbon dioxide laser or a free electron laser; and forming boron nitride nanotubes by reacting the decomposition product of the boron-metal catalyst composite in the gas state with the nitrogen precursor.

In an exemplary embodiment, a ratio of single-walled boron nitride nanotubes and double-walled boron nitride nanotubes in the formed boron nitride nanotubes may be 70 wt % to 99.9 wt %.

In another exemplary embodiment, the boron-metal catalyst composite may include a boron fiber and a metal catalyst deposited onto the boron fiber.

In another exemplary embodiment, the metal catalyst may be deposited by a deposition device including one or more selected from the group consisting of a deposition device using e-beam, a sputtering deposition device, an electroplating device, and an electroless plating device.

In another exemplary embodiment, the boron-metal catalyst composite may be a mixture of a boron powder including boron and a metal catalyst.

In another exemplary embodiment, the metal catalyst may include one or more selected from the group consisting of nickel (Ni), copper (Cu), iron (Fe), chromium (Cr), cobalt (Co), zinc (Zn), aluminum (Al), silicon (Si), scandium (Sc), titanium (Ti), vanadium (V), manganese (Mn), gallium (Ga), germanium (Ge), yttrium (Y), zirconium (Zr), niobium (Nb), molybdenum (Mo), technetium (Tc), ruthenium (Ru), rhodium (Rh), palladium (Pd), silver (Ag), hafnium (Hf), tantalum (Ta), tungsten (W), rhenium (Re), osmium (Os), iridium (Ir), platinum (Pt), gold (Au), bronze, stainless steel, white brass, brass, and a combination thereof.

In another exemplary embodiment, the boron-metal catalyst composite may further include a solid precursor including a nitrogen atom.

In another exemplary embodiment, the injecting of the nitrogen precursor into the reaction chamber may be carried out under a pressure condition of 1 atm to 300 atm.

In another exemplary embodiment, when the boron nitride nanotubes are prepared so as to include a metal catalyst, the method may further include: etching the metal catalyst from the boron nitride nanotubes by using an etchant including any one selected from the group consisting of ammonium persulfate, a nickel etchant, a copper etchant, iron chloride ($FeCl_3$), nitric acid, hydrochloric acid, and sulfuric acid.

In another exemplary embodiment, the boron nitride nanotubes may be prepared so as to have an average internal diameter of 1 nm to 10 nm.

According to the present disclosure, it is possible to prepare boron nitride nanotubes including a high ratio of boron nitride nanotubes with single and double walls at a fast rate. In particular, the previously invented technologies have difficulty in selectively synthesizing boron nitride nanotubes having a few walls including single walls, but since the present disclosure uses metal particles as a catalyst in the preparation process, boron nitride nanotubes, particularly, boron nitride nanotubes with single and double walls may be prepared with excellent efficiency, so that high-quality boron nitride nanotubes may be prepared.

Further, boron nitride nanotubes to be prepared according to the preparation method of the present disclosure are prepared so as to have excellent physical properties, and thus may be widely applied to a composite material, and the like. Specifically, the boron nitride nanotubes of the present disclosure have high physical properties such as heat resistance, corrosion resistance, chemical resistance, and thermal conductivity, and thus may also be widely used in the fiber field, and the like.

DETAILED DESCRIPTION

In the present specification, 'metal particle' or 'metal catalyst' is a metal particle which serves as a catalyst and has a size from nanometers to micrometers, and means metal particles deposited through various deposition methods.

In the present specification, 'boron nitride nanotubes' mean a material having a structure in which three of each of boron having a honeycomb lattice shape and nitrogen intersect with adjacent atoms to form sp2 covalent bonds. As a basic repeating unit of the boron nitride nanotubes, boron and nitrogen atoms are each basically formed, but a polygonal structure may also be formed in the preparation step. The boron nitride nanotubes mean a broad concept including single-walled, few-walled, and multiple-walled boron nitride nanotubes.

In the present specification, 'boron nitride nanotubes with single and double walls' mean a concept including single-walled boron nitride nanotubes and double-walled boron nitride nanotubes.

In the present specification, 'a solid precursor including a nitrogen atom' means a precursor including nitrogen (N) in a solid state.

Hereinafter, embodiments of the present disclosure will be described in detail with reference to accompanying drawings. Embodiments of the present disclosure have been described with reference to accompanying drawings, but have been described for illustration, and the technical spirit of the present disclosure and the configuration and application thereof are not limited thereby.

An embodiment of the present disclosure provides a method for preparing boron nitride nanotubes, the method including: injecting a boron-metal catalyst composite into a reaction chamber; injecting a nitrogen precursor into the reaction chamber; producing a decomposition product of the boron-metal catalyst composite in a gas state by irradiating the boron-metal catalyst composite with a carbon dioxide laser or a free electron laser; and forming boron nitride nanotubes by reacting the decomposition product of the boron-metal catalyst composite in the gas state with the nitrogen precursor.

Hereinafter, each step of the method will be reviewed in detail.

First, a boron-metal catalyst composite is injected into a reaction chamber.

Figure 1A:
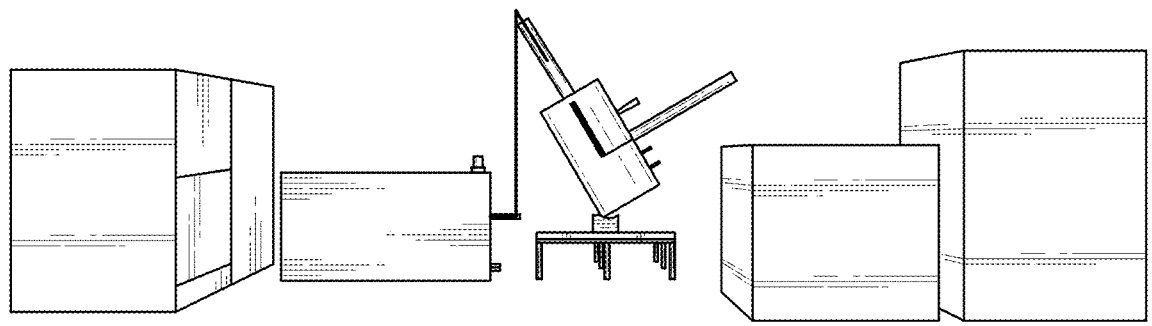
FIG. 1A is a schematic view of a preparation device of boron nitride nanotubes according to an embodiment of the present disclosure, and FIGS. 1B and 1C schematically illustrate the reaction of a decomposition product of a boron-metal catalyst composite with a nitrogen precursor in a reaction chamber.

FIG. 1A is a schematic view of a preparation device of boron nitride nanotubes according to an embodiment of the present disclosure. Referring to FIG. 1A, the preparation device includes a supply device including a nitrogen precursor, a discharge device which discharges reacted gases or unreacted gases, and the like present therein, and a reaction chamber in which devices including a lens having a stable transmission rate, through which laser can be transmitted, are installed.

In an exemplary embodiment, the boron-metal catalyst composite may include a boron fiber and a metal catalyst deposited onto the boron fiber.

In another exemplary embodiment, the boron fiber may be a pure boron fiber or a boron fiber including boron nitride. Alternatively, the boron fiber may include a material in the form of a fiber having a diameter of several hundred micrometers or less, which is obtained by depositing boron onto a metal wire using a CVD process, or a material prepared in the form of a boron nitride fiber having a diameter of several hundred micrometers or less.

When the boron-metal catalyst composite includes a metal catalyst deposited onto a boron fiber, the metal catalyst may be deposited by a deposition device including one or more selected from the group consisting of a deposition device using e-beam, a sputtering deposition device, an electroplating device, and an electroless plating device.

Alternatively, a metal layer may also be formed by depositing the metal catalyst onto the boron fiber. That is, the boron-metal catalyst composite may include a boron fiber and a metal layer which is deposited onto the boron fiber and includes a metal catalyst.

In an exemplary embodiment, the metal catalyst is not limited, but may be included within a range of 0.01 wt % to 80 wt % based on the total weight of the boron fiber.

Meanwhile, even though a metal catalyst is included in an extremely small amount in the boron-metal catalyst composite, boron nitride nanotubes with single and double walls may be prepared with an excellent efficiency. For example, even though the metal catalyst is included within a range of 0.01 wt % to 10 wt % based on the total weight of the boron fiber, boron nitride nanotubes with single and double walls may be prepared with an excellent efficiency.

Meanwhile, in contrast, the boron-metal catalyst composite may also be a mixture of a boron powder including boron and a metal catalyst. In this case, since the evaporation of boron generated during the synthesis process of boron nitride nanotubes occurs in a relatively large surface area, the production rate of boron nitride nanotubes may be very high.

In another exemplary embodiment, the boron powder may be a pure boron powder or a compressed boron nitride powder.

In an embodiment, when the boron-metal catalyst composite is a mixture of a boron powder and a metal catalyst, the metal catalyst may be included at a weight ratio of 0.01 wt % to 80 wt % based on the total weight of the boron powder in the boron-metal catalyst composite.

Meanwhile, even though the metal catalyst is included in an extremely small amount, boron nitride nanotubes with single and double walls may be prepared with an excellent efficiency. For example, even though the metal catalyst is included at a weight ratio of 0.01 wt % to 10 wt % based on the total weight of the boron powder, boron nitride nanotubes with single and double walls may be prepared with an excellent efficiency.

In an exemplary embodiment, the metal catalyst may include one or more selected from the group consisting of nickel (Ni), copper (Cu), iron (Fe), chromium (Cr), cobalt (Co), zinc (Zn), aluminum (Al), silicon (Si), scandium (Sc), titanium (Ti), vanadium (V), manganese (Mn), gallium (Ga), germanium (Ge), yttrium (Y), zirconium (Zr), niobium (Nb), molybdenum (Mo), technetium (Tc), ruthenium (Ru), rhodium (Rh), palladium (Pd), silver (Ag), hafnium (Hf), tantalum (Ta), tungsten (W), rhenium (Re), osmium (Os), iridium (Ir), platinum (Pt), gold (Au), bronze, stainless steel, white brass, brass, and a combination thereof.

Meanwhile, the boron-metal catalyst composite may further include a solid precursor including a nitrogen atom.

In an embodiment, the boron-metal catalyst composite may further include a solid precursor including a nitrogen atom in an amount of 50.0 at. % or less, preferably 1 at. % to 50.0 at. % based on the total mass of the boron-metal catalyst composite.

In an embodiment, the solid precursor including a nitrogen atom may be hexagonal boron nitride (h-BN).

Meanwhile, before the boron-metal catalyst composite is injected into a reaction chamber, any one process of an annealing process, a sintering process, and a surface cleaning process may be further carried out. When the process is carried out, the strength of the boron-metal catalyst composite may be increased, and the purity thereof may be improved.

Subsequently, a nitrogen precursor is injected into the reaction chamber.

In an exemplary embodiment, the injecting of the nitrogen precursor into the reaction chamber may be carried out under a pressure condition of 1 atom or more and 300 atm or less, preferably 1 atm or more and 200 atm or less, and more preferably 5 atm or more and 20 atm or less.

In another exemplary embodiment, the nitrogen precursor is not limited as long as the nitrogen precursor is a gas precursor including nitrogen, but may include one or more selected from the group consisting of, for example, precursors in a gas state, which include a nitrogen atom such as nitrogen ($N_2$) and ammonia ($NH_3$).

Meanwhile, in an embodiment, when the nitrogen precursor is injected, a hydrogen gas ($H_2$) may be further injected.

Thereafter, a decomposition product of a boron-metal catalyst composite in a gas state is produced by irradiating the boron-metal catalyst composite with a carbon dioxide laser or a free electron laser.

Specifically, the decomposition product is formed by irradiating the boron-metal catalyst composite with a carbon dioxide laser or a free electron laser, and decomposing the boron-metal catalyst composite using activate and reactive energy generated thereby. At this time, due to the high energy of the carbon dioxide laser or the free electron laser, the boron-metal catalyst composite is decomposed and evaporated, and as a result, a decomposition product of a boron-metal catalyst composite in a gas state may be formed, and boron (B) vapor may be generated on the surface of the decomposition product.

At this time, when the boron-metal catalyst composite includes a boron fiber and a metal layer which is formed on the boron fiber and includes a metal catalyst, the carbon dioxide laser or the free electron laser is irradiated onto a portion of the edges of a boron fiber and a metal layer formed on the boron fiber, and accordingly, the edge of the boron fiber is decomposed and evaporated, and as a result, a decomposition product may be formed and boron (B) vapor may be generated.

Meanwhile, when the decomposition product of the boron-metal catalyst composite is produced, it is possible to help the decomposition process to more smoothly proceed by continuously further supplying light, heat, atmospheric pressure plasma, and the like to the reaction chamber. Further, an atmospheric pressure plasma process may be further carried out.

Figure 1B:
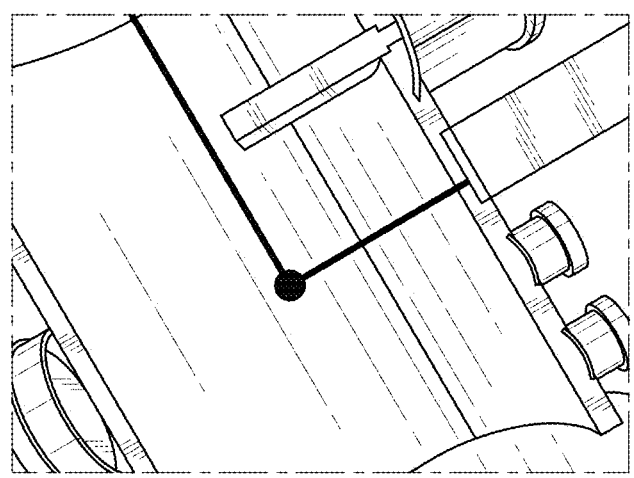
Figure 1C:

Thereafter, boron nitride nanotubes are formed by reacting the decomposition product of the boron-metal catalyst composite in a gas state and/or boron (B) vapor with the nitrogen precursor of the reaction chamber (see FIG. 1C).

Specifically, boron (B) vapor generated on the surface of the above-described decomposition product may be reacted with nitrogen (N) of the injected nitrogen precursor and subjected to processes such as adsorption, surface diffusion, nucleation point production, and growth, and then may be grown into boron nitride nanotubes.

At this time, the metal catalyst of the metal layer may also be reacted with boron (B) and/or a nitrogen precursor, and in this case, the boron nitride nanotubes may be prepared so as to include a metal catalyst.

Meanwhile, when the boron nitride nanotubes are prepared so as to include a metal catalyst, a step of etching the metal catalyst from the boron nitride nanotubes may be further carried out by using an etchant including any one selected from the group consisting of ammonium persulfate, a nickel etchant, a copper etchant, iron chloride ($FeCl_3$), nitric acid, hydrochloric acid, and sulfuric acid, and the metal catalyst may be removed from the boron nitride nanotubes through a simple chemical method as described above.

In an exemplary embodiment, the reaction chamber may be maintained so as to have a temperature within a range of 20° C. to 1,400° C. When the temperature of the reaction chamber is maintained within the range, the synthesis rate may be improved because the synthesis speed of the boron nitride nanotubes is relatively fast.

As described above, the boron nitride nanotubes according to the present disclosure may be produced by reacting a decomposition product of a boron-metal catalyst composite formed by laser with the nitrogen precursor. In general, when boron nitride nanotubes are synthesized, it is difficult to selectively synthesize boron nitride nanotubes having a few walls including single walls, but according to the method of the present disclosure, boron nitride nanotubes with single and double walls may be prepared with an excellent efficiency because the boron nitride nanotubes having a few walls are used as a metal catalyst in the preparation process.

A ratio of single-walled boron nitride nanotubes and double-walled boron nitride nanotubes in the formed boron nitride nanotubes according to the present disclosure may be 70 wt % to 99.9 wt %.

Further, according to the existing methods for preparing boron nitride nanotubes, boron nitride nanotubes having a relatively large diameter are prepared, but according to the method for preparing boron nitride nanotubes according to the present disclosure, boron nitride nanotubes having an average internal diameter of about 1 nm to about 10 nm may be prepared, and in this case, the overall quality may be improved because most of the entire boron nitride nanotubes are selectively synthesized as a structure which has single walls and double walls.

In addition, according to the preparation method of the present disclosure, boron nitride nanotubes are prepared at a fast production rate to reduce production costs, and the boron nitride nanotubes are prepared so as to have a high quality, so that an improvement in productivity may be achieved due to the low defective rate.

Hereinafter, the present disclosure will be described in more detail through Examples. These Examples are only for exemplifying the present disclosure, and it will be obvious to those skilled in the art that the scope of the present disclosure is not interpreted to be limited by these Examples.

EXAMPLES

Example 1

An iron (Fe) metal catalyst was deposited onto a boron fiber (thickness: 102 micrometers) purchased from Specialty Materials, INC., USA using an e-beam deposition device to prepare a boron-metal catalyst composite including a metal layer deposited onto the boron fiber.

Thereafter, the boron-metal catalyst composite was injected into a reaction chamber of a preparation device as illustrated in FIG. 1, and a nitrogen precursor ($N_2$) having a high pressure of 14 atm was injected into the chamber. Thereafter, boron (B) vapor was generated by irradiating an end portion of the boron-metal catalyst composite with a continuous carbon dioxide laser, and boron nitride nanotubes were prepared by reacting the boron (B) vapor with a nitrogen precursor (see FIG. 1B and FIG. 1C).

Comparative Example 1

Boron nitride nanotubes were prepared by carrying out the same process as in Example 1, except that a boron fiber (thickness: 102 micrometers) purchased from Specialty Materials, INC., USA was used instead of the boron-metal catalyst composite in Example 1.

Experimental Examples

[Confirmation of Surface of Boron-Metal Catalyst Composite]

Figure 2A:
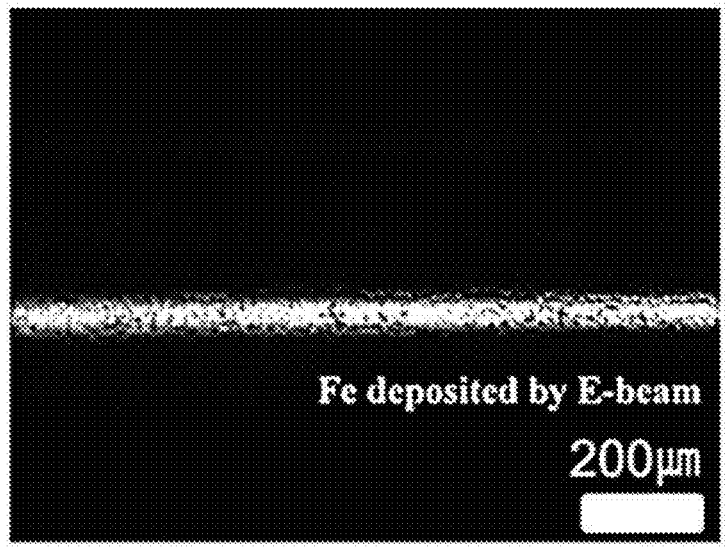
FIGS. 2A and 2B are a microscope photograph of a boron-metal catalyst composite prepared according to an embodiment of the present disclosure, and illustrate a photograph of a boron fiber onto which Fe is deposited.
Figure 2B:
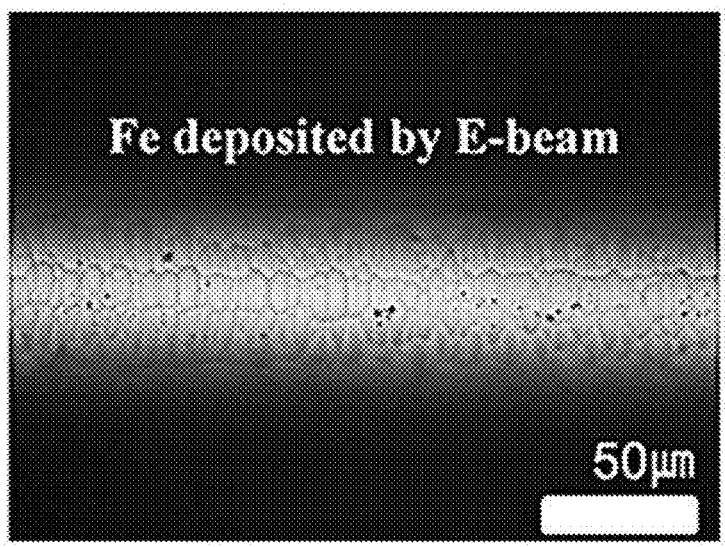

The surface of the boron-metal catalyst composite in Example 1 was observed, and is illustrated in FIGS. 2A and 2B. Referring to FIGS. 2A and 2B, it could be confirmed that iron catalyst particles were deposited onto the boron fiber.

[Confirmation of Production of Boron Nitride Nanotubes]

Figure 3A:
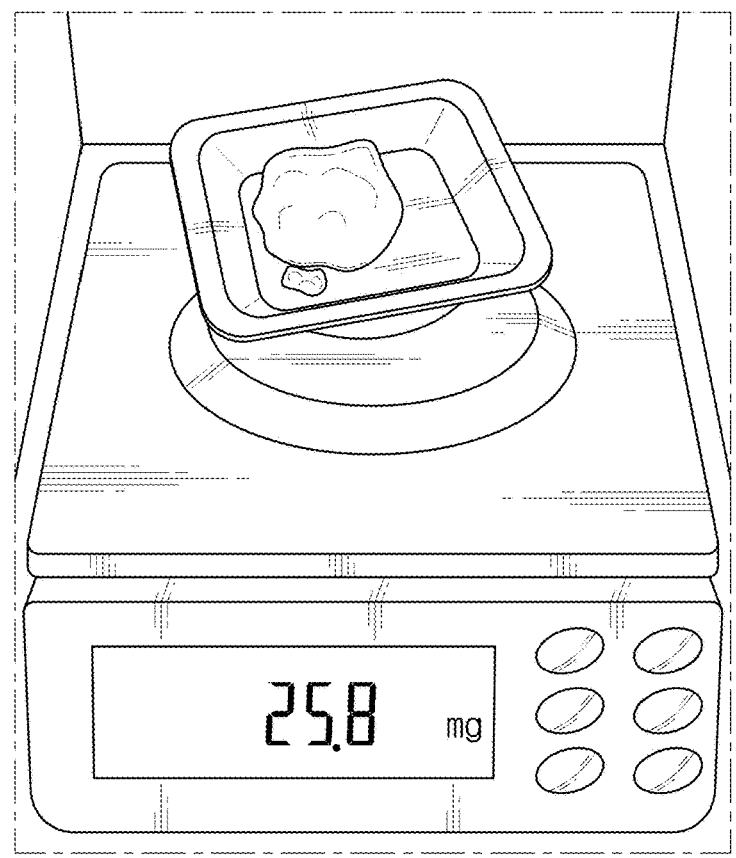
FIG. 3A is a photograph illustrating a mass measurement experiment of the boron nitride nanotubes prepared according to an embodiment of the present disclosure.
Figure 3B:
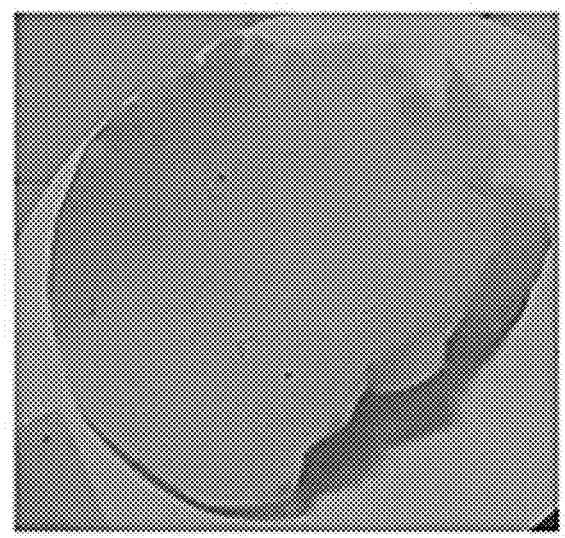
FIG. 3B is a photograph of the boron nitride nanotubes prepared according to the Comparative Example.
Figure 3C:
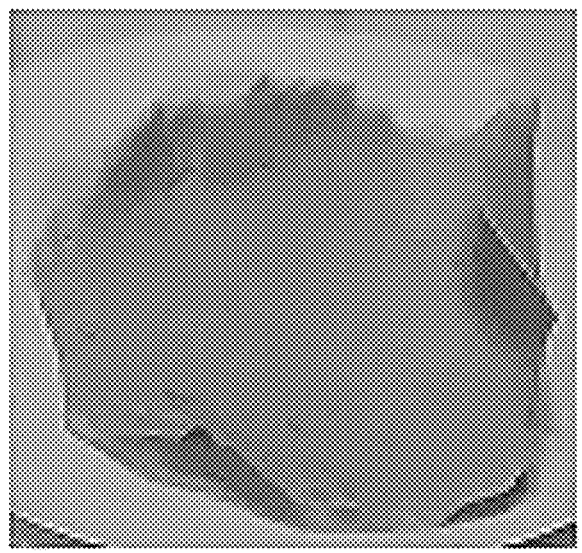
FIG. 3C is a photograph of the boron nitride nanotubes according to the Example.
Figure 3D:
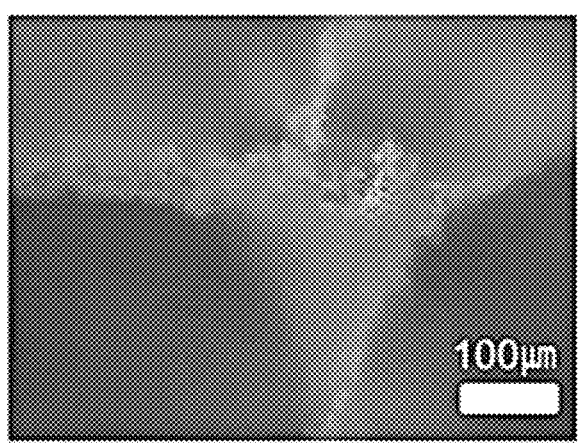
FIG. 3D is a photograph illustrating an optical microscopy (OM) analysis result of boron nitride nanotubes.

1) The mass of the boron nitride nanotubes prepared according to Example 1 was measured (FIG. 3A), and the surfaces of the boron nitride nanotubes prepared according to Comparative Example 1 and the surfaces of the boron nitride nanotubes prepared according to Example 1 were observed (FIGS. 3B and 3C). Further, an optical microscopy (OM) analysis was carried out on the boron nitride nanotubes prepared according to Example 1, and the result is illustrated in FIG. 3D.

Referring to FIGS. 3A to 3D, it could be confirmed that when a metal catalyst was used during the preparation of the boron nitride nanotubes, the metal catalyst was oxidized, and as a result, showed brown color, and it could be confirmed that boron nitride nanotubes having an excellent quality were prepared.

Figure 4A:
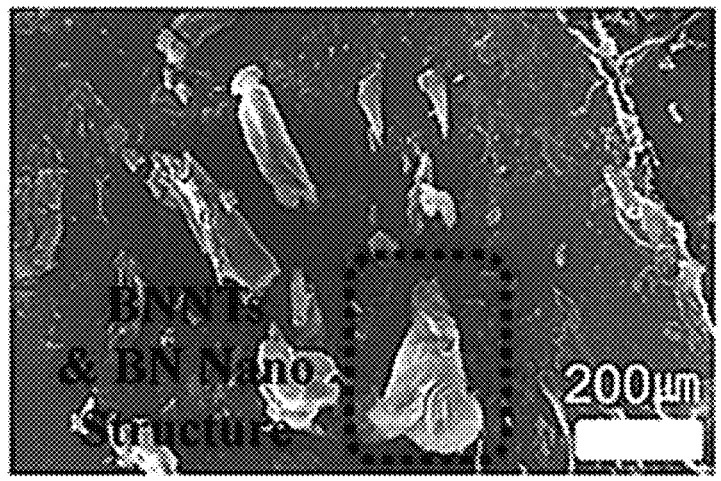
FIGS. 4A and 4B are photographs illustrating a scanning electron microscope (SEM) of the boron nitride nanotubes prepared according to an embodiment of the present disclosure.
Figure 4B:
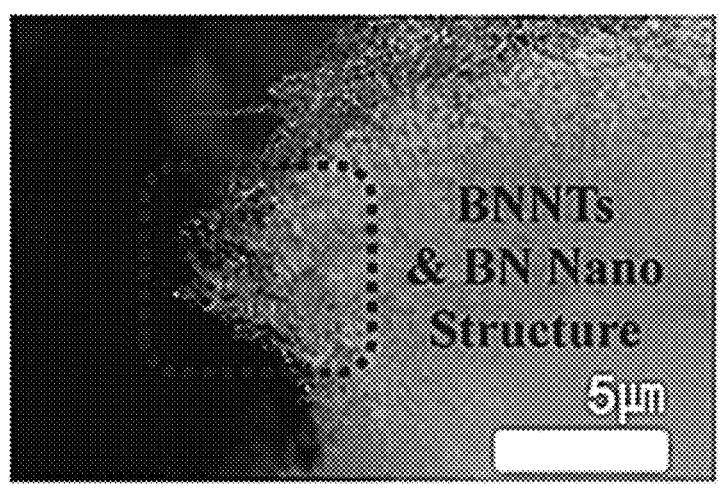
Figure 4C:
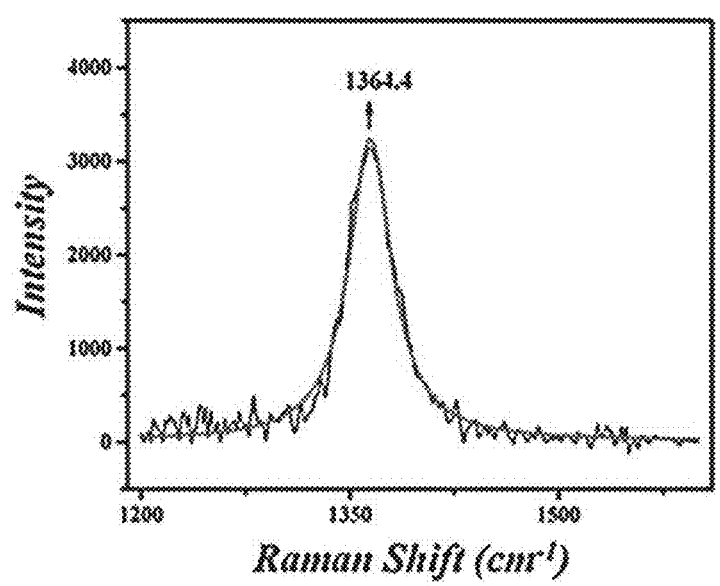
FIG. 4C illustrates a Raman analysis result of a lattice vibration scattering mode of the boron nitride nanotubes prepared according to an embodiment of the present disclosure.
Figure 4D:
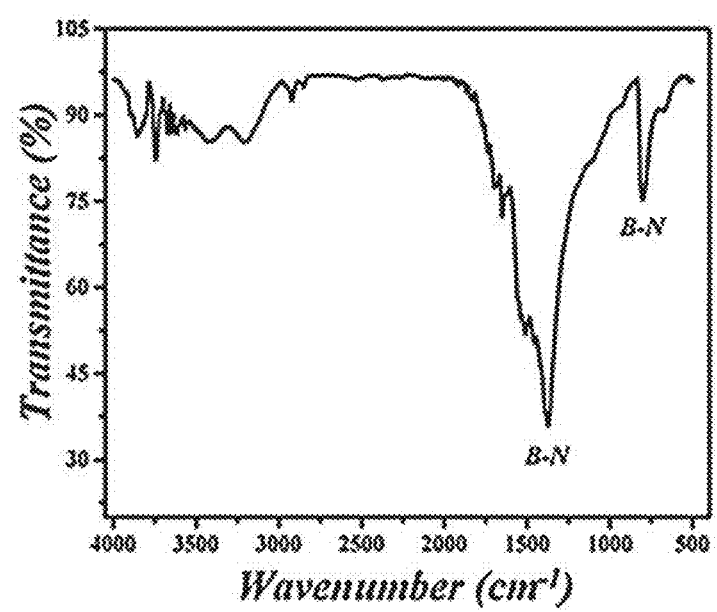
FIG. 4D illustrates a fourier transform infrared spectroscope (FT-IR) analysis result of the boron nitride nanotubes prepared according to an embodiment of the present disclosure.
Figure 5A:
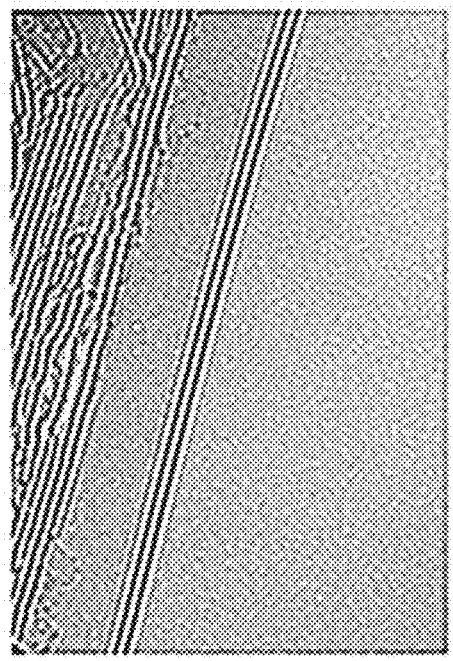
FIGS. 5A to 5G illustrate a transmission electron microscope (TEM) analysis result which observes an interlayer structure of the boron nitride nanotubes prepared according to an embodiment of the present disclosure.
Figure 5B:
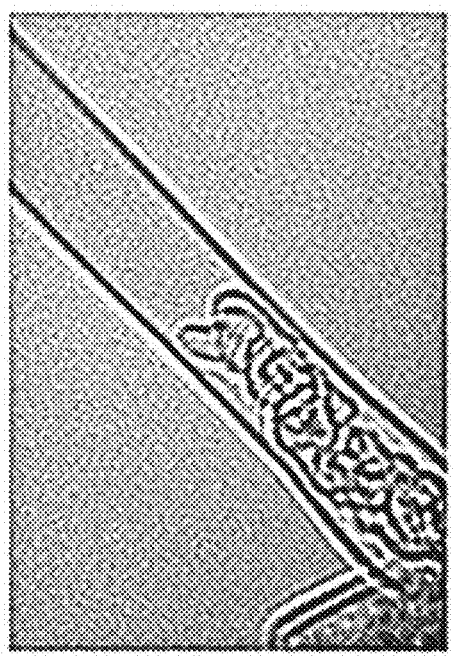
Figure 5C:
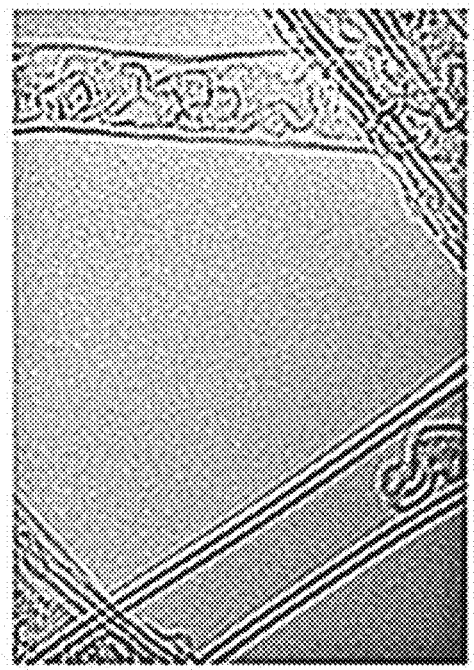
Figure 5D:
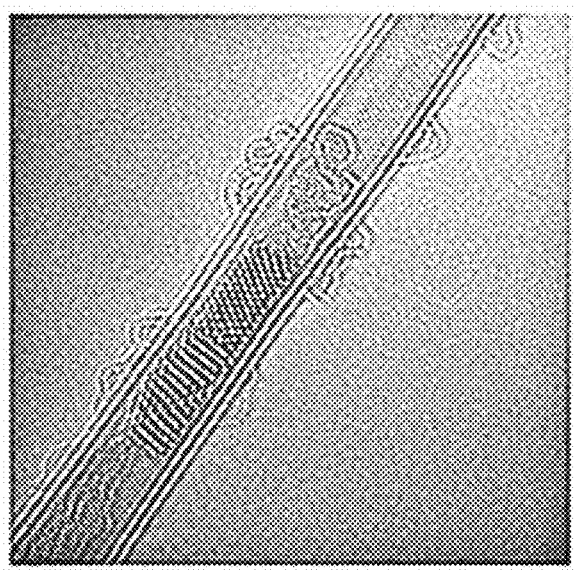
Figure 5E:
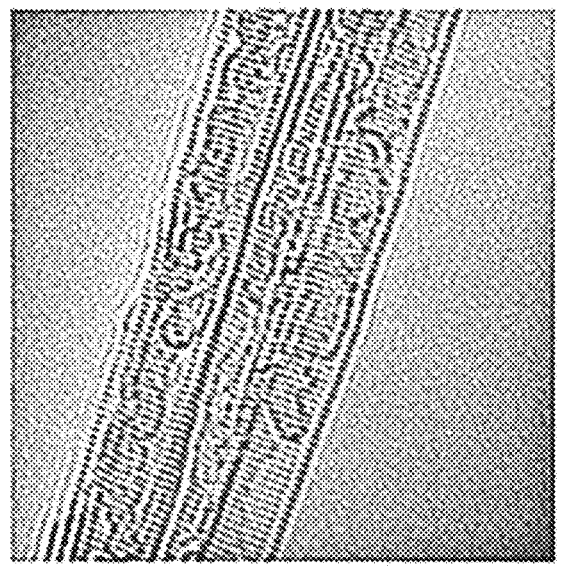
Figure 5F:
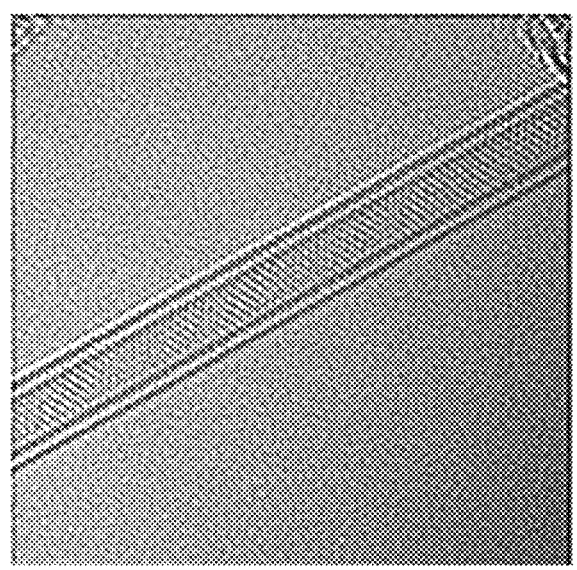
Figure 5G:
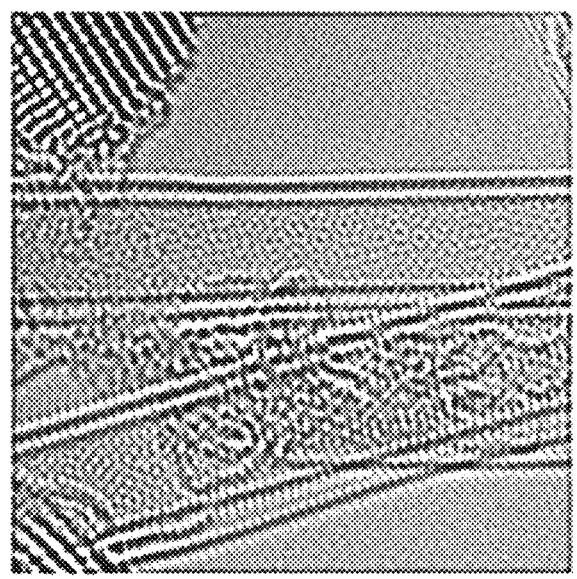

2) Further, a scanning electron microscope (SEM) analysis result of the boron nitride nanometers prepared according to Example 1 is illustrated in FIGS. 4A and 4B, and a lattice vibration scattering mode of the boron nitride nanotubes prepared according to Example 1 was analyzed by Raman and fourier transform infrared spectroscope (FT-IR), and the analysis results are illustrated in FIGS. 4C and 4D. In addition, the interlayer structure of the boron nitride nanotubes prepared according to Example 1 were observed and analyzed by a transmission electron microscope (TEM), and the results are illustrated in FIGS. 5A to 5G. Referring to FIGS. 5A to 5G, it could be confirmed that the boron nitride nanotubes usually included single-walled boron nitride nanotubes and double-walled boron nitride nanotubes. Further, it could also be confirmed that iron particles were present between adjacent boron nitride nanotube bundles, and inside or outside the boron nitride nanotubes. In addition, referring to FIGS. 4A to 4D and FIGS. 5A to 5G, it could be confirmed that through the van deer Waals-bonds, boron nitride nanotube bundles having an average internal diameter of about 1 nm to about 10 nm were formed, and it could be confirmed that a metal catalyst was present inside or outside a composite which formed the boron nitride nanotube bundles (FIGS. 4A to 4D and FIGS. 5A to 5G).

Figure 6A:
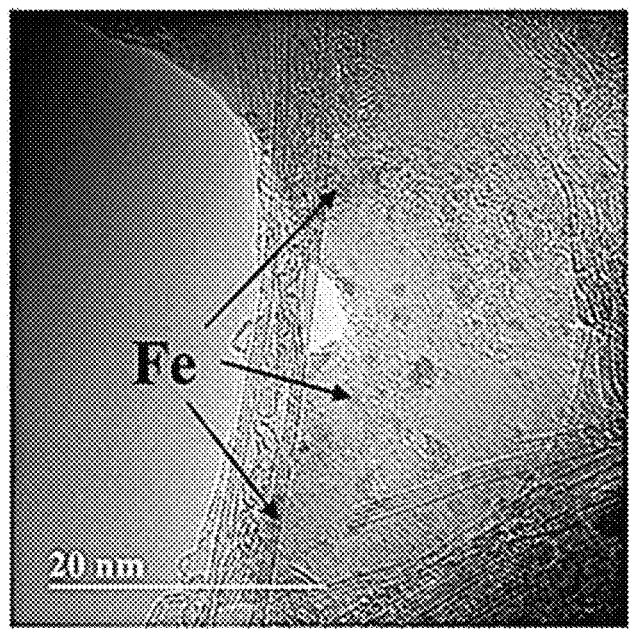
FIGS. 6A to 6C each illustrate transmission electron microscope (TEM) and energy dispersive X-ray spectroscopy (EDS) analysis results of the metal catalyst of the boron nitride nanotubes prepared according to an embodiment of the present disclosure.
Figure 6B:
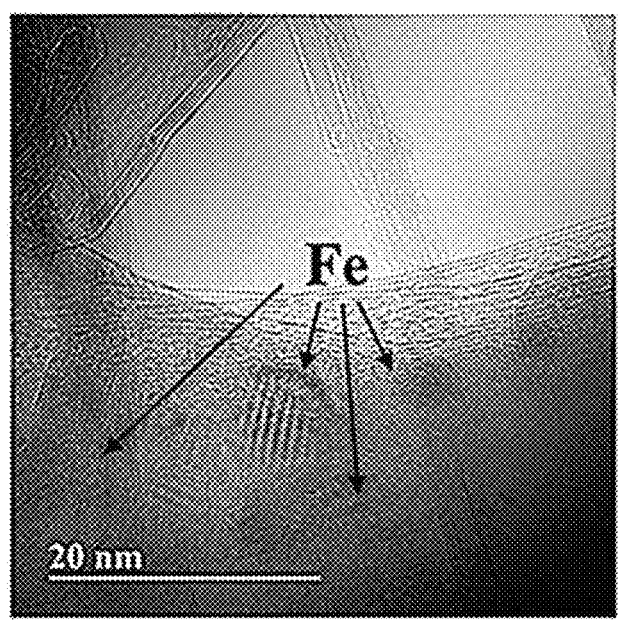
Figure 6C:
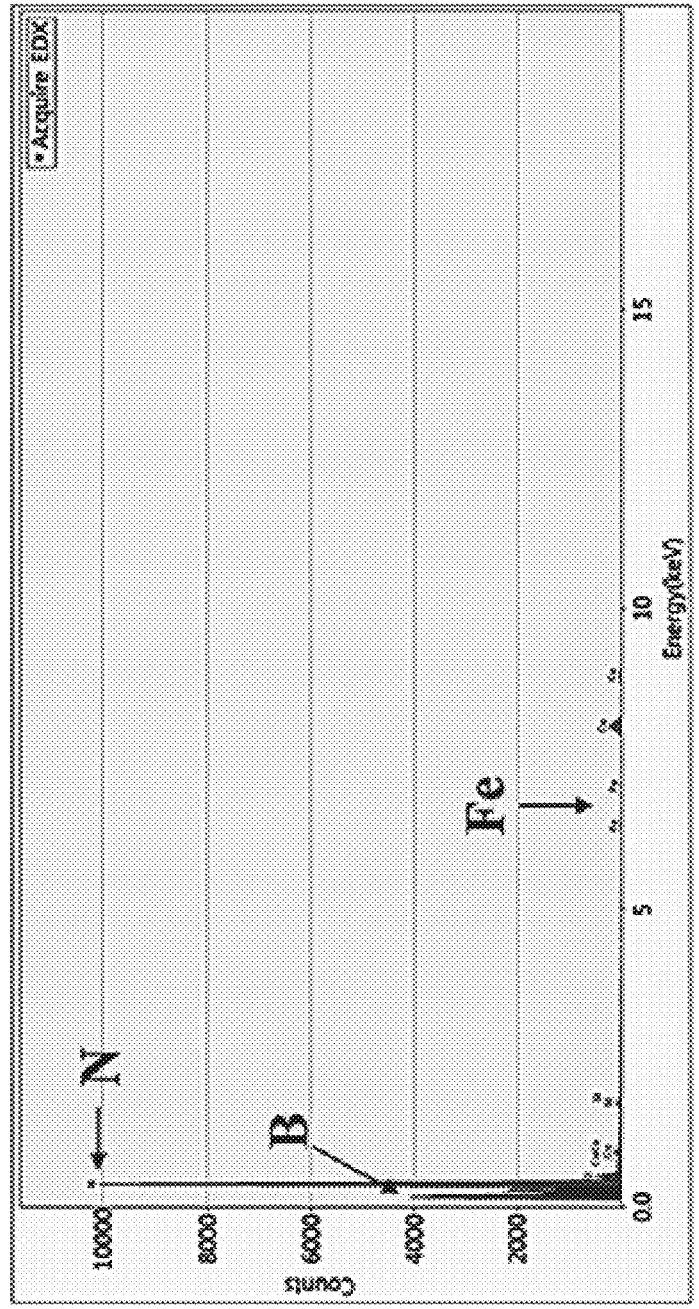
Figure 7:
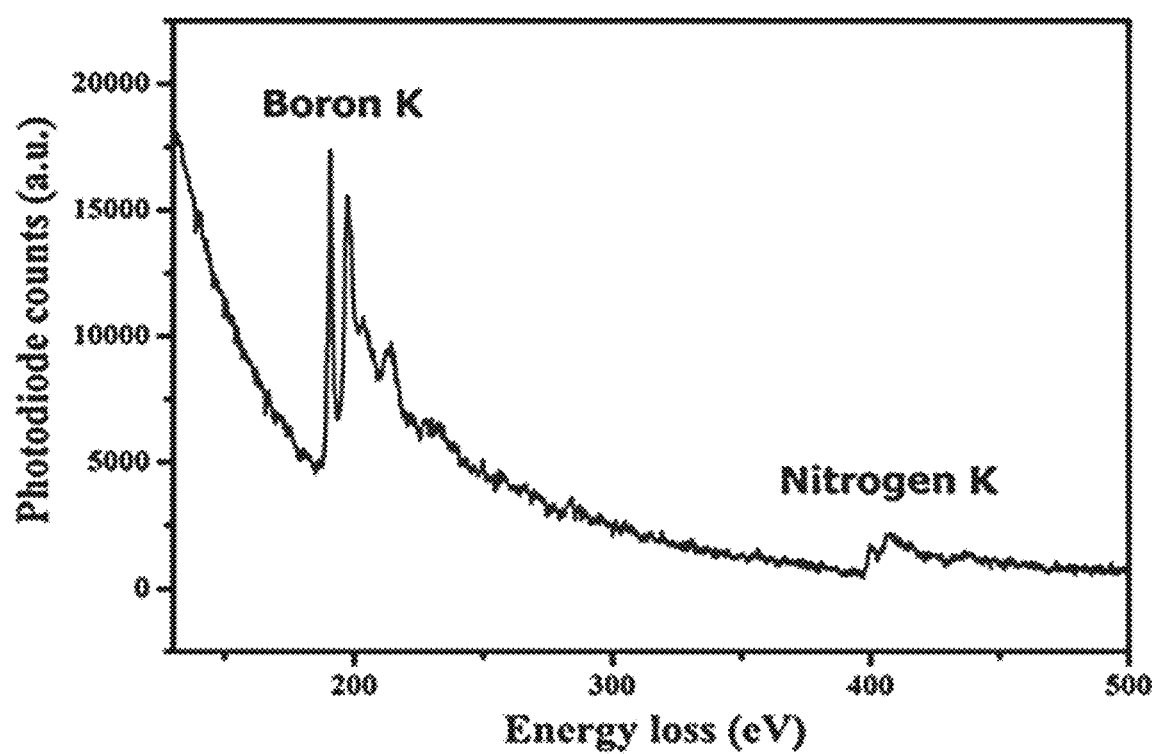
FIG. 7 illustrates an element analysis result of the boron nitride nanotubes prepared according to an embodiment of the present disclosure by using an electron energy loss spectroscopy (EELS) analysis device.

Meanwhile, when the boron nitride nanotubes prepared according to Example 1 include metal particles, transmission electron microscope (TEM) and energy dispersive X-ray spectroscopy (EDS) analysis results thereof are illustrated in FIGS. 6A to 6C, an element analysis was carried out on the boron nitride nanotubes prepared according to Example 1 by using an electron energy loss spectroscopy (EELS) analysis device, and the results are illustrated in FIG. 7.

Referring to the EDS analysis results in FIGS. 6A to 6C, it could be confirmed that iron particles were included in a smaller amount than nitrogen and boron elements, but boron nitride nanotubes including iron particles were prepared, and as a result of the EELS analysis in FIG. 7, it could be again confirmed that the synthesized material in the form of nanotubes is a material composed of boron and nitrogen.

[Confirmation of Contents of Single-Walled and Double-Walled Boron Nitride Nanotubes in Boron Nitride Nanotubes]

Figure 8:
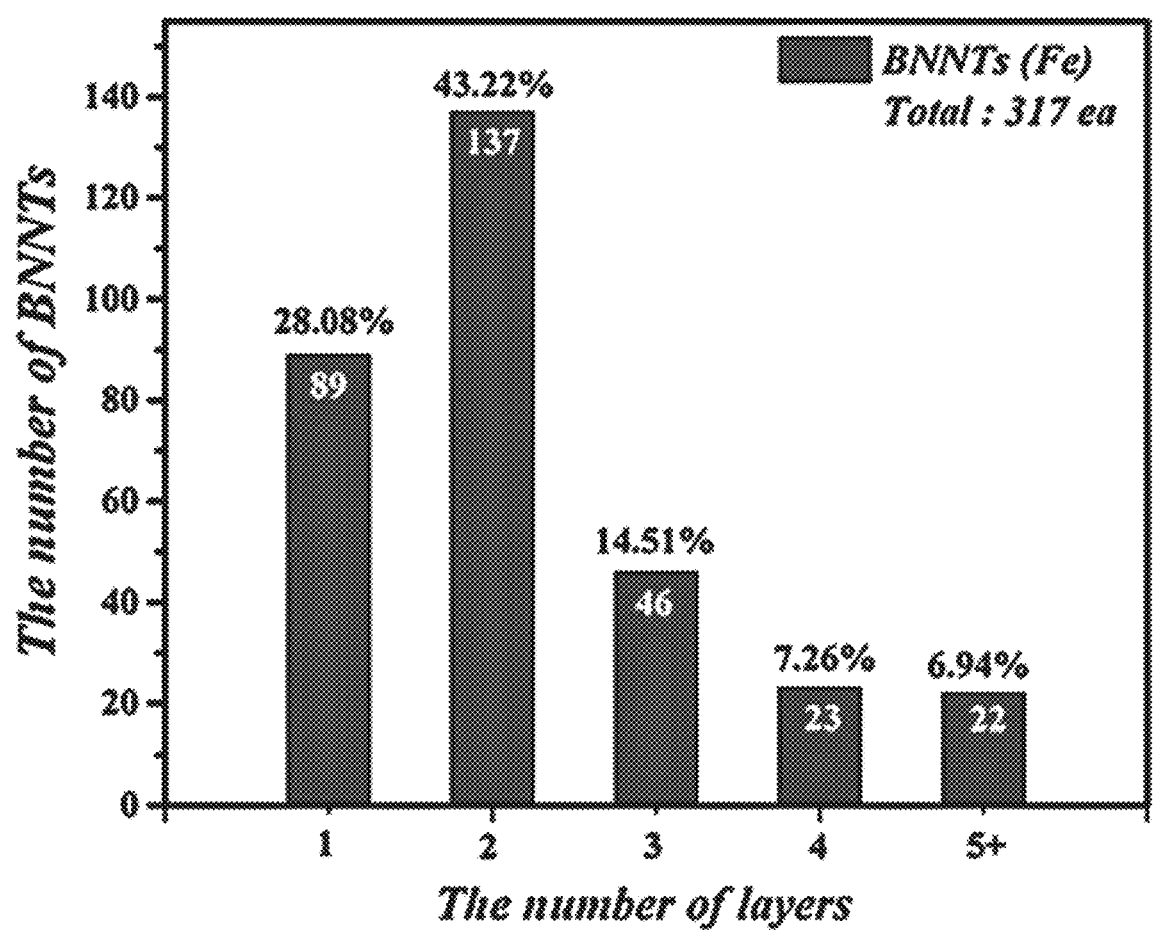
FIG. 8 illustrates a graph which analyzes the number of walls of the boron nitride nanotubes prepared according to an embodiment of the present disclosure.

The number and ratio of single-walled, double-walled, triple-walled, quadruple-walled, and multiple-walled boron nitride nanotubes in the boron nitride nanotubes prepared according to an embodiment of the present disclosure were measured, and the results are illustrated in FIG. 8 and Table 1.

TABLE 1

|  | Single-walled | Double-walled | Triple-walled | Quadruple-walled | Multiple-walled | Total number |
|---|---|---|---|---|---|---|
| Boron nitride nanotubes | 89 | 137 | 46 | 23 | 22 | 317 |
| Percentage (%) | 28.08 | 43.22 | 14.51 | 7.26 | 6.94 | 100 |

Referring to FIG. 8 and Table 1, it was determined that in the prepared boron nitride nanotubes, the preparation ratio of double-walled boron nitride nanotubes was about 45%, which is the highest value, and the preparation ratio of single-walled and double-walled boron nitride nanotubes was about 72%. Accordingly, when boron nitride nanotubes were prepared by using the metal catalyst according to the present disclosure, it could be confirmed that high-quality boron nitride nanotubes including a plurality of single-walled boron nitride nanotubes and double-walled boron nitride nanotubes could be formed with an excellent efficiency.

The Examples of the present disclosure previously described should not be interpreted to limit the technical spirit of the present disclosure. The scope of the present disclosure to be protected is limited only by the matters described in the claims, and those skilled in the art of the present disclosure can improve and change the technical spirit of the present disclosure in various forms. Therefore, such improvements and changes would fall within the scope of the present disclosure to be protected as long as they are obvious to those skilled in the art.

What is claimed is:

1. A method for preparing boron nitride nanotubes, the method comprising:
    injecting a boron-metal catalyst composite into a reaction chamber;
    injecting a nitrogen precursor into the reaction chamber;
    producing a decomposition product of the boron-metal catalyst composite in a gas state by irradiating the boron-metal catalyst composite with a carbon dioxide laser or a free electron laser; and
    forming boron nitride nanotubes by reacting the decomposition product of the boron-metal catalyst composite in the gas state with the nitrogen precursor, wherein the boron nitride nanotubes comprise a metal catalyst, and
    etching the metal catalyst from the boron nitride nanotubes by using an etchant,
    wherein a ratio of single-walled boron nitride nanotubes and double-walled boron nitride nanotubes in the boron nitride nanotubes is 70 wt % to 99.9 wt %.

2. The method according to claim 1, wherein the boron-metal catalyst composite further comprises a solid precursor comprising a nitrogen atom.

3. The method according to claim 1, wherein the injecting of the nitrogen precursor into the reaction chamber is carried out under a pressure condition of 1 atm to 300 atm.

4. The method according to claim 1, wherein
    the etchant comprises any one selected from the group consisting of ammonium persulfate, a nickel etchant, a copper etchant, iron chloride ($FeCl_3$), nitric acid, hydrochloric acid, and sulfuric acid.

5. The method according to claim 4, wherein the metal catalyst comprises one or more selected from the group consisting of nickel (Ni), copper (Cu), iron (Fe), chromium (Cr), cobalt (Co), zinc (Zn), aluminum (Al), silicon (Si), scandium (Sc), titanium (Ti), vanadium (V), manganese (Mn), gallium (Ga), germanium (Ge), yttrium (Y), zirconium (Zr), niobium (Nb), molybdenum (Mo), technetium (Tc), ruthenium (Ru), rhodium (Rh), palladium (Pd), silver (Ag), hafnium (Hf), tantalum (Ta), tungsten (W), rhenium (Re), osmium (Os), iridium (Ir), platinum (Pt), gold (Au), bronze, stainless steel, white brass, brass, and a combination thereof.

6. The method according to claim 5, wherein the metal catalyst comprises iron metal catalyst.

7. The method according to claim 1, wherein the boron nitride nanotubes are prepared so as to have an average internal diameter of 1 nm to 10 nm.

8. The method according to claim 1, wherein the metal catalyst is included within a range of 0.01 wt % to 80 wt % based on a total weight of boron.

9. The method according to claim 8, wherein the metal catalyst is included within a range of 0.01 wt % to 10 wt % based on a total weight of boron.

10. The method according to claim 1, wherein etching the metal catalyst from the boron nitride nanotubes comprises using ammonium persulfate.

11. The method according to claim 1, wherein etching the metal catalyst from the boron nitride nanotubes comprises using a nickel etchant.

12. The method according to claim 1, wherein etching the metal catalyst from the boron nitride nanotubes comprises using a copper etchant.

13. The method according to claim 1, wherein etching the metal catalyst from the boron nitride nanotubes comprises using iron chloride ($FeCl_3$).

14. The method according to claim 1, wherein etching the metal catalyst from the boron nitride nanotubes comprises using hydrochloric acid.

15. The method according to claim 1, wherein etching the metal catalyst from the boron nitride nanotubes comprises using sulfuric acid.

16. A method for preparing boron nitride nanotubes, the method comprising:
   injecting a boron-metal catalyst composite into a reaction chamber;
   injecting a nitrogen precursor into the reaction chamber;
   producing a decomposition product of the boron-metal catalyst composite in a gas state by irradiating the boron-metal catalyst composite with a carbon dioxide laser or a free electron laser; and
   forming boron nitride nanotubes by reacting the decomposition product of the boron-metal catalyst composite in the gas state with the nitrogen precursor,
   wherein a ratio of single-walled boron nitride nanotubes and double-walled boron nitride nanotubes in the boron nitride nanotubes is 70 wt % to 99.9 wt %, and
   wherein the boron-metal catalyst composite comprises a pure boron fiber and a metal catalyst deposited onto the pure boron fiber.

17. The method according to claim 16, wherein the metal catalyst is deposited by a deposition device comprising one or more selected from the group consisting of a deposition device using e-beam, a sputtering deposition device, an electroplating device, and an electroless plating device.

18. A method, the method comprising:
   injecting a boron-metal catalyst composite into a reaction chamber, wherein the boron-metal catalyst composite is a mixture of a pure boron powder and a metal catalyst;
   injecting a nitrogen precursor into the reaction chamber;
   producing a decomposition product of the boron-metal catalyst composite in a gas state by irradiating the boron-metal catalyst composite with a carbon dioxide laser or a free electron laser; and
   forming boron nitride nanotubes by reacting the decomposition product of the boron-metal catalyst composite in the gas state with the nitrogen precursor,
   wherein a ratio of single-walled boron nitride nanotubes and double-walled boron nitride nanotubes in the boron nitride nanotubes is 70 wt % to 99.9 wt %.

19. The method according to claim 18, wherein the metal catalyst comprises one or more selected from the group consisting of nickel (Ni), copper (Cu), iron (Fe), chromium (Cr), cobalt (Co), zinc (Zn), aluminum (Al), silicon (Si), scandium (Sc), titanium (Ti), vanadium (V), manganese (Mn), gallium (Ga), germanium (Ge), yttrium (Y), zirconium (Zr), niobium (Nb), molybdenum (Mo), technetium (Tc), ruthenium (Ru), rhodium (Rh), palladium (Pd), silver (Ag), hafnium (Hf), tantalum (Ta), tungsten (W), rhenium (Re), osmium (Os), iridium (Ir), platinum (Pt), gold (Au), bronze, stainless steel, white brass, brass, and a combination thereof.

20. The method according to claim 19, wherein the metal catalyst comprises iron metal catalyst.

* * * * *